(12) United States Patent
Dugan et al.

(10) Patent No.: US 6,473,224 B2
(45) Date of Patent: Oct. 29, 2002

(54) CONFIGURABLE SAFETY SHUTDOWN FOR AN OPTICAL AMPLIFIER USING NON-VOLATILE STORAGE

(75) Inventors: J. Michael Dugan, Richardson, TX (US); David Eugene Bath, Garland, TX (US); Mike R. Moothart, Richardson, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/727,565

(22) Filed: Dec. 1, 2000

(65) Prior Publication Data

US 2002/0101651 A1 Aug. 1, 2002

(51) Int. Cl.[7] .............................................. H04B 10/12
(52) U.S. Cl. ................. 359/341.44; 359/341.3
(58) Field of Search .................. 359/110, 115, 359/341.43, 341.44, 333, 341.1, 341.3

(56) References Cited

U.S. PATENT DOCUMENTS

| | | | | | |
|---|---|---|---|---|---|
| 5,278,686 A | * | 1/1994 | Grasso | ......................... | 359/110 |
| 5,355,250 A | * | 10/1994 | Grasso | ......................... | 359/341 |
| 5,440,418 A | * | 8/1995 | Ishimura | ..................... | 359/177 |
| 5,442,479 A | * | 8/1995 | Biilow | ......................... | 359/341 |
| 5,467,219 A | * | 11/1995 | Ushirozawa | ................ | 359/341 |
| 5,539,570 A | * | 7/1996 | Ushirozawa | ................ | 359/341 |
| 5,563,731 A | * | 10/1996 | Asahi | ......................... | 359/341 |
| 5,615,033 A | * | 3/1997 | Yoshida | ....................... | 359/110 |
| 5,703,711 A | * | 12/1997 | Hamada | ....................... | 359/341 |
| 5,796,505 A | * | 8/1998 | Ushirozawa | ................ | 359/160 |
| 6,064,501 A | * | 5/2000 | Roberts | ....................... | 359/110 |
| 6,259,554 B1 | * | 6/2001 | Shigematsu | ................ | 359/337 |
| 6,317,255 B1 | * | 11/2001 | Fatehi et al. | ................ | 359/177 |
| 6,344,915 B1 | * | 2/2002 | Alexander et al. | .......... | 359/134 |

OTHER PUBLICATIONS

FITEL Technologies, Inc. Data Sheet ErFA 3300 Series "Fully Digitized MPU Controlled EDFA" Feb. 2000.*
Sirius Optical Driver Amplifier— Constellation Series data sheet, section 6, Aug. 1999.*

* cited by examiner

Primary Examiner—Thomas H. Tarcza
Assistant Examiner—Andrew R Sommer
(74) Attorney, Agent, or Firm—Locke, Liddell & Sapp, LLP; V. Lawrence Sewell; Jessica W. Smith

(57) ABSTRACT

A system for configuring an optical amplifier in a fiber optic communications network including a safety shutdown input, includes a non-volatile memory for storing optical amplifier parameters. Circuitry is provided for inputting amplifier parameters into the memory and for changing previously stored amplifier parameters. Configuration of the optical amplifier parameters cannot be changed until a hardware control input is actuated. The system also provides for an indication of a mismatch between newly input parameters and previously stored optical amplifier parameters.

15 Claims, 2 Drawing Sheets

CONFIGURABLE SAFETY SHUTDOWN FOR AN OPTICAL AMPLIFIER USING NON-VOLATILE STORAGE

TECHNICAL FIELD OF THE INVENTION

The present invention relates to fiber optic communications networks, and more particularly to a configurable safety shutdown for an optical amplifier using non-volatile storage for system configuration for reliably controlling a safety shutdown function in the event of a fiber optic transmission line disconnect or cut.

BACKGROUND OF THE INVENTION

The demand for communications capacity on fiber optic communications networks has resulted in increased use of wavelength-division multiplex (WDM) systems. WDM systems provide another level of multiplexing to individual or already multiplexed channels. In WDM systems, the individual transmission channels are carried on separate optical wavelengths and are combined in a single fiber at the optical link layer. WDM systems are generally used when the number of fibers in a transmission link is inadequate for the capacity or becomes a critical cost item.

The distances between WDM optical equipment and the signal transmission rates may be attenuation and/or dispersion limited. As a result, amplifiers are employed to boost signal strength to overcome these limitations due to losses from WDM devices, dispersion compensating fibers/gratings, connectors, splices, and fiber. As amplifier designs and WDM systems have evolved, so has the need for increased power grown. Optical power levels generated by fiber optic transmission systems can therefore be high enough to be hazardous to the human eye. If the transmission fiber is disconnected or accidentally cut or broken, the open end of the fiber can be emitting hazardous power, and this emission can possible be pointed into a person's eye. This power is higher when multiple optical channels are transmitted over a single fiber, as in WDM systems. Even higher power levels are generated when optical amplifiers are used.

Fiber optic transmission systems may employ a safety shutdown function which will shut down the optical output when the fiber is disconnected, cut, or broken. Such existing safety shutdown systems are based on the detection of input loss of power, which is then used to shut down the optical output. The operation of an optical amplifier is controlled by various parameters including, for example, shutdown, restart off period, restart on period, and loss of signal threshold. These parameters allow optical amplifiers within the optical transmission system to be configurable, depending upon the specific application and location within the system. Configuration and reconfiguration of such parameters within an optical amplifier may be accomplished by utilizing system software to configure logic gates within an optical amplifier module. However, due to the use of volatile software configurable logic gates, there exists the possibility that the gates may be accidentally reprogrammed to a configuration which makes the optic transmission system unsafe. Such undesirable changes may occur when a module is removed from the system and reinserted in a different location or plugged back into a same location. Furthermore, internal system software changes may occur to reconfigure an optical amplifier without knowledge of a system operator.

A need has thus arisen for a system for reliably configuring an optical amplifier safety shut down function in a fiber optic transmission network where the network may utilize configurable optical amplifiers such as, for example, erbium-doped fiber amplifiers (EDFAs) and other remote pumped EDFAs for boosting signal strength in WDM systems to ensure proper amplifier configuration.

SUMMARY OF THE INVENTION

In accordance with the present invention, in a fiber optic communications network having an optical amplifier including a safety shutdown input, a system for configuring the optical amplifier is provided. The system includes a non-volatile memory for storing optical amplifier parameters. Circuitry is provided for inputting amplifier parameters into the memory and for changing previously stored amplifier parameters. Configuration of the optical amplifier parameters cannot be changed until a hardware control input is actuated via manual intervention. The system also provides for an indication of a mismatch between newly input parameters and previously stored optical amplifier parameters.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
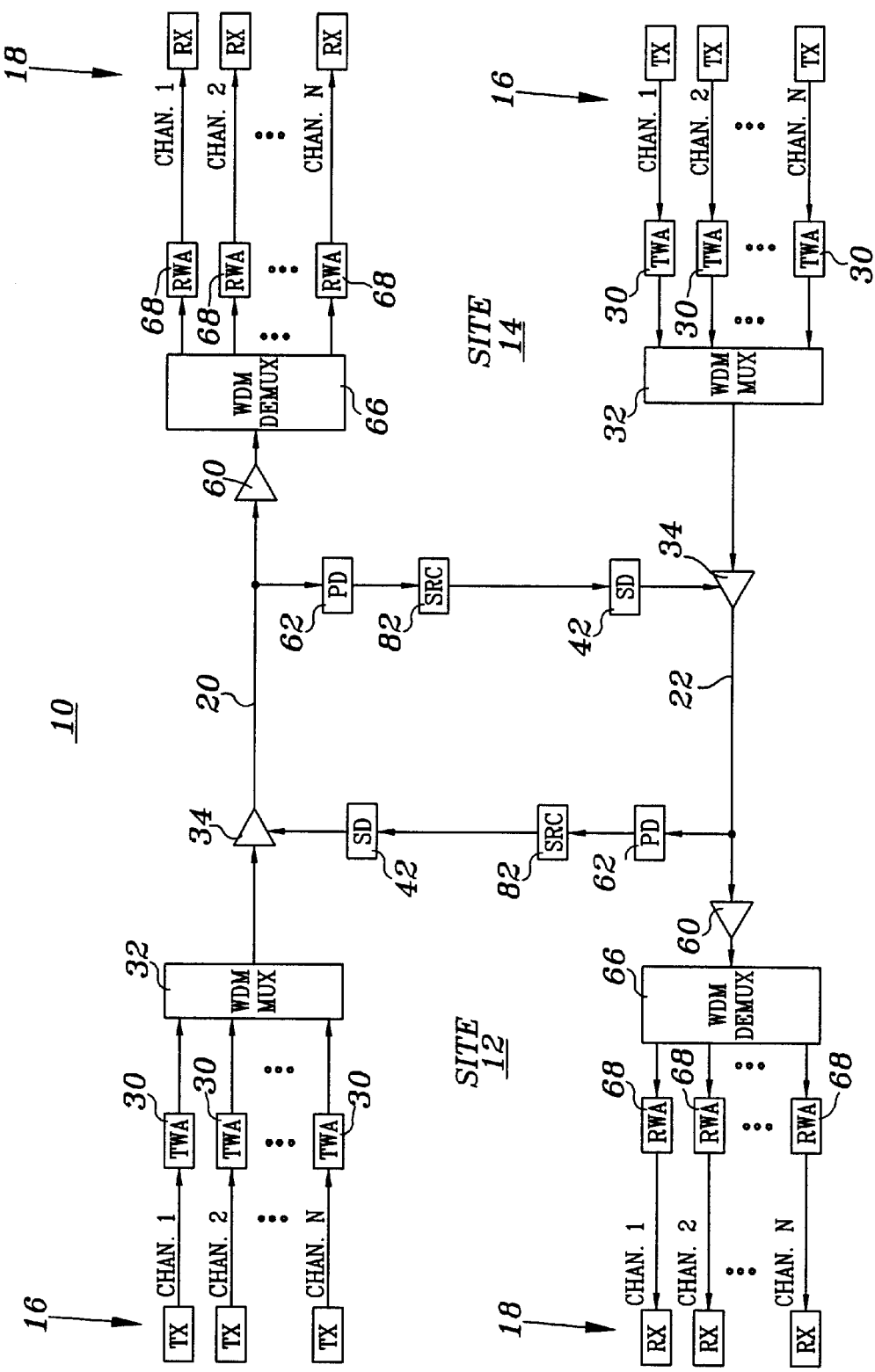
FIG. 1 is a block diagram of a fiber optic communications network utilizing the present configurable optical amplifier safety shutdown function.

Referring to FIG. 1, an optical fiber transmission communications network is illustrated, and is generally identified by the numeral 10. Optical fiber transmission network 10 interconnects a site 12 to a site 14. Each site 12 and 14 includes a group of transmitters 16 and a group of receivers 18. Transmitters 16 of site 12 communicate with receivers 18 of site 14 via an optical fiber transmission line, generally identified by the numeral 20. Transmitters 16 of site 14 communicate with receivers 18 of site 12 via an optical fiber transmission line, generally identified by the numeral 22. Whereas network 10 has been illustrated utilizing two lines 20 and 22, the present invention can also be utilized in a bi-directional fiber transmission system.

Transmitters 16 located at sites 12 and 14 are similarly configured, and like numerals will be utilized for like and corresponding components. Similarly, receivers 18 located at sites 12 and 14 are similarly configured, and like numerals will be utilized for like and corresponding components of receivers 18. Transmitters 16 and receivers 18 are part of external terminal equipment devices or other transmission systems. As used herein, terminal equipment will include equipment as well as additional networks. Each transmitter input signal is applied to a transmit wavelength adapter (TWA) 30. Each TWA 30 is a transponder module which is used as an input interface device for each data channel as data enters network 10. The transponder module performs a series of functions: it receives and detects the incoming transmitter signal, and it regenerates the input signal, and transmits the data signal with a modulator and a wavelength-stabilized single-mode CW laser.

The output of each TWA 30 is an individual wavelength that is applied to a WDM multiplexer 32 which combines the multiple 1-N wavelength channels into a composite multi-wavelength (multi-channel) signal for transmission. The output of multiplexer 32 is applied to an amplifier, such as, for example, an erbium doped fiber amplifier (EDFA) transmit optical fiber amplifier 34 whose output is applied to optical fiber transmission line 20. Transmit optical fiber amplifier 34 also includes a shutdown control 42.

Receiver 18 at site 14 includes a EDF amplifier 60. A photodetector 62 is connected at the input of EDF amplifier 60. Detection of loss of input power by photodetector 62 actuates a shutdown-restart control 82 which includes shutdown logic and a fail-safe restart timer to actuate shutdown control 42 and thereby terminate operation of transmit optical fiber amplifier 34 in transmitter 16 of site 14. Additionally, after shutdown, shutdown-restart control 82 functions to turn the associated amplifier back on after the fiber has been repaired. Shutdown-restart control 82 operates to turn an amplifier on for a predetermined time period and then off for a predetermined time period. This on/off cycle is repeated until the fiber is repaired. The on and off periods are configurable parameters of the amplifier as well as the shutdown provisioning and loss of signal threshold provisioning of the amplifier. These parameters are set by system software.

The output of amplifier 60 is applied to a WDM demultiplexer 66. The multiple outputs of demultiplexer 66 are each applied to the multiple receive wavelength adapters (RWA) 68. Receive wavelength adapter 68 includes a transponder module used as an output interface device for each data channel as data exits from the WDM system at site 14 via channels 1-N to terminal equipment receivers 18 at site 14. RWA 68 uses a high performance receiver to detect and recover the received signal, monitors the quality of the received signal, monitors the signal trace code, and regenerates the optical signal for sending signals out of WDM network site 14 to terminal equipment receivers 18 at site 14.

An important aspect of the present invention is the use of the present shutdown-restart control 82 utilizing a non-volatile storage to store the configuration parameters that are provided by the system software. The configuration is placed into a temporary location by the system software once the desired configuration has been entered via a system interface, and then the operator manually stores this configuration in the non-volatile memory via a switch. The parameter configurations cannot be changed until the switch is operated again so that the shutdown operation is under hardware control thereby improving the reliability due to hardware circuitry.

Figure 2:
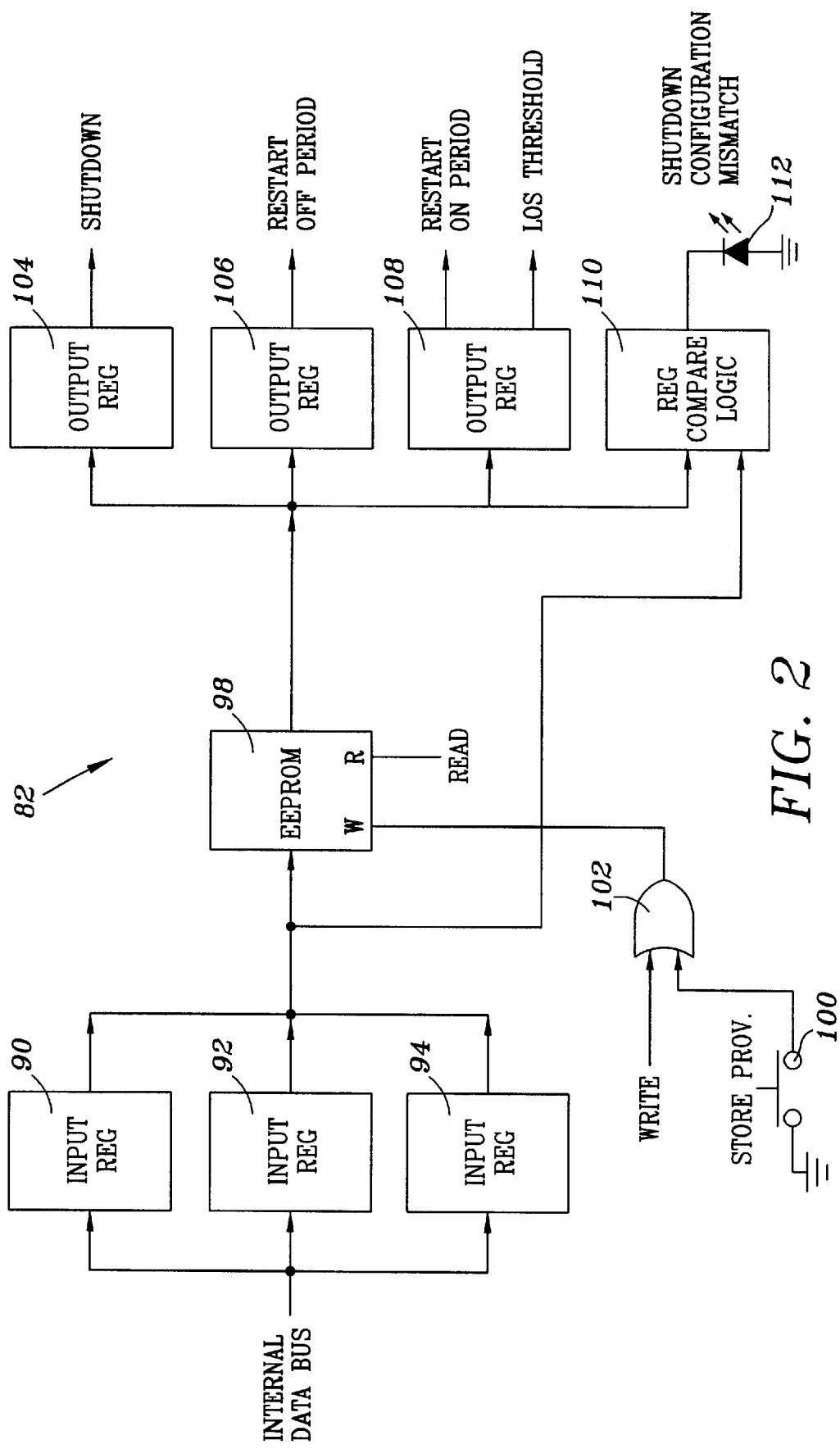
FIG. 2 is a logic block diagram of an embodiment of the present amplifier.

Referring now to FIG. 2, a portion of shutdown-restart control 82 is illustrated. Amplifier configuration parameters are input to shutdown-restart control 82 via an internal data bus. Information is stored in input registers 90, 92, and 94 for such configurable parameters as the on and off periods of an optical amplifier and the loss of signal threshold. Registers 90, 92, and 94 temporarily store these parameters. These parameters are then stored in a non-volatile storage memory such as, for example, an electronically erasable, programmable read-only memory (EEPROM) 98. Data input to EEPROM 98 is accomplished through a write signal and a signal generated by closure of a pushbutton switch 100. These signals are applied to an OR gate 102 which enables the write function of EEPROM 98. It is only through operation of switch 100 that parameters stored in registers 90, 92, and 94 are transferred to EEPROM 98. The configuration parameters stored in EEPROM 98 are input to the system and associated optical amplifier via output registers 104, 106, and 108. Register 104 provides shutdown provisioning, register 106 provides restart off period, and register 108 provides for restart on period and loss of signal threshold.

The output of EEPROM 98 is also applied to a register compare logic 110 which also receives as an input the output of registers 90, 92, and 94. Compare logic 110 compares the contents of register 90 to register 104, the contents of register 92 to register 106, and the contents of register 94 to register 108. In this manner, the operator is alerted as to whether any new configuration parameters which have been input into registers 90, 92, and 94 are different from the previously stored configuration parameters in EEPROM 98. Parameter mismatch is indicated by a visible indicator, such as, for example, illumination of a light emitting diode 112. In this manner, any inadvertent or accidental change in configuration parameters input via the internal data bus will be detected when compared to previously stored configuration parameters through the operation of compare logic 110, and a visual indication will be provided to the system operator that the system desires to change configuration parameters. If, in fact, the configuration parameters are to be changed, the system operator then actuates switch 100 to load new configuration parameters into EEPROM 98 for a new system configuration. Therefore, a positive action is required by the system operator to reconfigure the parameters of the shutdown-restart control 82 of an optical amplifier in network 10. The present system thereby confirms whether the same parameter configuration exists when a module is unplugged and replugged back into the system, or when a module is replaced by a new module.

It therefore can be seen that the present invention provides for a reliable control for a safety shutdown of an optical amplifier of a fiber optic communications network in which configuration parameters are reliably set and which require a hardware action for reset.

Whereas the present invention has been described with respect to specific embodiments thereof, it will be understood that various changes and modifications will be suggested to one skilled in the art and it is intended to encompass such changes and modifications as fall within the scope of the appended claims and is not limited to specific components and features, individually or in combination which have been disclosed. Such components and features are not the only types of systems components and features that can create signal degredations that are resolved by the use of the present invention.

What is claimed is:

1. In a fiber optic communications network including an optical signal transmitter and an optical signal receiver and having an optical amplifier for transmitting signals between the transmitter and the receiver, the optical amplifier having a safety shutdown input for receiving a shutdown signal for controlling the amplifier to prevent transmission of signals between the transmitter and the receiver, a system for controlling changes to shutdown parameters of the optical amplifier comprising:

a non-volatile memory for storing optical amplifier shutdown parameters;

registers connected to an internal data bus that receives and stores new optical amplifier shutdown parameters for loading into said non-volatile memory; and a switch connected to the non-volatile memory that must be actuated by manual intervention in order to load the new optical amplifier shutdown parameters from said registers into said non-volatile memory.

2. The system of claim 1 wherein said switch includes a manual switch operable to enter new optical amplifier shutdown parameters into said memory.

3. The system of claim 1 and further including:
a comparator for comparing the new optical amplifier shutdown parameters stored in the registers with previously stored optical amplifier shutdown parameters in the non-volatile memory.

4. The system of claim 3 and further including:
an indicator for indicating a mismatch between the new optical amplifier shutdown parameters stored in the registers and the previously stored optical amplifier shutdown parameters in the non-volatile memory.

5. In a fiber optic communications network including an optical signal transmitter and an optical signal receiver and having an optical amplifier for transmitting signals between the transmitter and the receiver, the optical amplifier having a safety shutdown input for receiving a shutdown signal for controlling the amplifier to prevent transmission of signals between the transmitter and the receiver, a system for controlling the optical amplifier comprising:
a non-volatile memory for storing optical amplifier shutdown parameters;
a data bus connected to said non-volatile memory for inputting new optical amplifier shutdown parameters into said non-volatile memory; and
a controller that must be manually actuated in order to change previously stored optical amplifier shutdown parameters in said non-volatile memory to the new optical amplifier shutdown parameters.

6. The system of claim 5 wherein said controller includes a manual switch operable to enter the new optical amplifier shutdown parameters into said non-volatile memory.

7. The system of claim 5 and further including:
a comparator for comparing the new optical amplifier shutdown parameters with the previously stored optical amplifier shutdown parameters in the non-volatile memory.

8. The system of claim 7 and further including:
a display for indicating a mismatch between the new optical amplifier shutdown parameters and the previously stored optical amplifier shutdown parameters in said non-volatile memory.

9. An optical fiber telecommunications system comprising:
a first terminal including a first optical signal transmitter for transmitting optical telecommunications signals and a first optical signal receiver for receiving optical telecommunications signals;
a second terminal including a second optical transmitter for transmitting optical telecommunications signals and a second optical signal receiver for receiving optical telecommunications signals;
a first fiber optic transmission line interconnecting said first optical signal transmitter and said second optical signal receiver;
a second fiber optic transmission line interconnecting said second optical signal transmitter and said first optical signal receiver;
a first optical amplifier connected to said first fiber optic transmission line;
a second optical amplifier connected to said second fiber optic transmission line;
each of said optical amplifiers including an input for receiving a shutdown signal for controlling operation of said amplifier to prevent transmission of signals along said fiber optic transmission lines;
each of said optical amplifiers being connected to a non-volatile memory that includes previously stored optical amplifier shutdown parameters and for generating said shutdown signal:
a data bus connected to each of said memories for inputting new optical amplifier shutdown parameters into said non-volatile memories; and
a controller that must be actuated by a user to change the previously stored optical amplifier shutdown parameters in said non-volatile memories with the new optical amplifier shutdown parameters.

10. The system of claim 9 wherein said controller includes a manual switch operable to enter the new optical amplifier shutdown parameters into said memories.

11. The system of claim 9 and further including:
a comparator for comparing the new optical amplifier shutdown parameters with the previously stored optical amplifier shutdown parameters.

12. The system of claim 11 and further including:
a display for indicating a mismatch between the new optical amplifier shutdown parameters and the previously stored optical amplifier shutdown parameters.

13. The system of claim 9 wherein said optical shutdown parameters include an optical amplifier off time period.

14. The system of claim 9 wherein said optical shutdown parameters include an optical amplifier on time period.

15. The system of claim 9 wherein said optical shutdown parameter includes an optical amplifier loss of signal threshold.

* * * * *